United States Patent [19]
Ellis

[11] 3,829,581
[45] Aug. 13, 1974

[54] ALIPHATIC POLYCYCLIC AMIDOXIMES AS INFLUENZA ANTIVIRAL AGENTS

[75] Inventor: Richard L. Ellis, Wilmington, Del.

[73] Assignee: E. I. du Pont de Nemours and Company, Wilmington, Del.

[22] Filed: Oct. 19, 1972

[21] Appl. No.: 298,835

Related U.S. Application Data

[63] Continuation-in-part of Ser. No. 57,805, July 23, 1970, abandoned.

[52] U.S. Cl. ............................................. 424/327
[51] Int. Cl. ............................................ A61k 27/00
[58] Field of Search .................................. 424/327

[56] References Cited
UNITED STATES PATENTS

| | | | |
|---|---|---|---|
| 3,144,485 | 8/1964 | Benn et al. | 424/324 X |
| 3,394,181 | 7/1968 | Bell | 424/327 X |
| 3,423,458 | 1/1969 | Daeniker | 424/327 X |

FOREIGN PATENTS OR APPLICATIONS

| | | | |
|---|---|---|---|
| 1,244,592 | 9/1972 | Great Britain | 424/327 |

*Primary Examiner*—Jerome D. Goldberg

[57] ABSTRACT

Aliphatic polycyclic amidoximes exhibit influenza antiviral activity in warm-blooded animals. A typical compound is 1-adamantanecarboxamidoxime.

8 Claims, No Drawings

ALIPHATIC POLYCYCLIC AMIDOXIMES AS INFLUENZA ANTIVIRAL AGENTS

CROSS-REFERENCE TO RELATED APPLICATION

This application is a continuation-in-part of my co-pending application Ser. No. 57,805, filed July 23, 1970, now abandoned.

BACKGROUND OF THE INVENTION

1. Field of the Invention

This invention relates to aliphatic polycyclic compounds having influenza antiviral activity in warm-blooded animals. The compounds have a carboxamidoxime group attached directly to an aliphatic ring and up to one carbon to carbon unsaturation.

2. Prior Art

U.S. Pat. No. 3,144,485 issued in 1964 shows amidoximes where the amidoxime group is attached to an aryl substituted amino group. The compounds are stated to be antihistamines. U.S. Pat. No. 3,394,181 issued in 1968 shows amidoximes having aromatic substituents are useful as hypotensive agents. A general review article on amidoximes, their preparation and properties, is Eloy et al. Chem. Revs. 62, 155–183 (1962). The prior art compounds are not known to possess antiviral activity and differ structurally from the compounds of the present invention.

DESCRIPTION OF THE INVENTION

The influenza antiviral compositions of the invention comprise an effective amount of a. a compound of the formula $$\underset{R-\overset{\overset{\displaystyle N-O-R^1}{\|}}{C}-NH_2}{}$$

wherein

R = adamantyl, 4-methylbicyclo[2.2.2]octyl, tricyclo[4.3.1.1$^{3,8}$]undecanyl or tricyclo[4.3.1.1$^{3,8}$]undecenyl radicals, and R$^1$ = hydrogen or alkanoyl of 2–6 carbon atoms, or b. pharmaceutically acceptable salts of (a), dispersed in a pharmaceutically acceptable carrier.

The compounds may be prepared by reacting the corresponding aliphatic polycyclic nitrile with hydroxylamine according to the following equation.

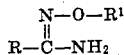

The reaction takes place generally in the presence of a base such as sodium carbonate and a solvent system such as aqueous ethanol and generally occurs at 50°–80°C. The product is isolated by crystallization.

The amidoxime can be converted to acid addition salts. For example, treatment of the amidoxime in an anhydrous solvent with gaseous hydrogen chloride gives the hydrochloride which is especially useful for pharmaceutical formulations.

The acylated derivatives may be prepared by reacting I with a carboxylic anhydride under anhydrous conditions.

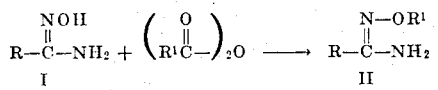

In each of the equations above R and R$^1$ are as previously described.

The nitriles employed as starting materials for the preparation of the amidoximes are readily available. Many are available from commercial sources while the others have either been described in the literature or their precursors are well known. When the alcohol is available, the nitrile can be prepared by reaction with methanesulfonyl chloride in pyridine followed by subsequent treatment with sodium cyanide, generally with dimethyl sulfoxide in the presence of sodium iodide. When the carboxylic acid is available, it can be converted to the amide and the latter refluxed with phosphorus oxychloride to give the nitrile.

SPECIFIC EMBODIMENTS OF THE INVENTION

The following examples are illustrative and non-limitative. All parts and percentages are by weight unless otherwise stated.

EXAMPLE 1

1-Adamantanecarboxamidoxime R = adamantyl; R$^1$=H

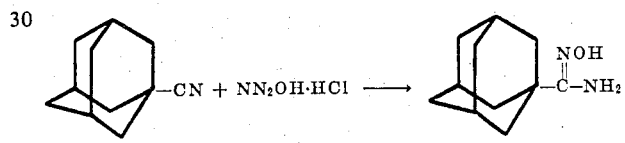

A round bottom flask equipped with a reflux condenser and magnetic stirrer was charged initially with 8.10 g (0.05 moles) of 1-adamantanecarbonitrile and 40 ml of ethyl alcohol. Subsequently, 30 ml of water was added followed by 10.60 g (0.10 moles) of sodium carbonate powder and 14.0 g (0.02 moles) of hydroxylamine hydrochloride. The resulting slurry was stirred 4 hours at 25°C followed by 16 hours reflux. After cooling slightly, the mixture was filtered and the filter cake rinsed with 50 ml fresh, refluxing ethyl alcohol. The total filtrate was concentrated at reduced pressure to 0.25 to 0.33 its initial volume and the product extracted with three fresh portions of chloroform. The combined extracts were washed with water, dried over anhydrous sodium sulfate, filtered and concentrated at reduced pressure to give the crude, white product. Two crops of white, crystalline plates were obtained from aqueous ethyl alcohol giving 8.65 g (90 percent yield) of 1-adamantanecarboxamidoxime, mp 209–210 (dec);

$\lambda_{max}^{KBr}$ 2.81 (NH), 2.93 (NH), 3.09 (OH), 3.42 (CH), 6.05 (C=N) and 6.33 μ (-NH$_2$).

Anal. Calcd. for C$_{11}$H$_{18}$N$_2$O: C, 68.00; H, 9.34; N, 14.42
Found: C, 68.26; H, 9.52; N, 14.59

EXAMPLE 2

1-Adamantanecarboxamidoxime hydrochloride

R=adamantyl;
R¹=H

In a flame-dried Erlenmeyer flask equipped with a drying tube, 2.25 g of 1-adamantanecarboxamidoxime was dissolved in anhydrous ethyl ether, stirred and treated slowly with ethereal hydrogen chloride to give a white precipitate. The salt was filtered, rinsed with fresh, anhydrous ethyl ether and recrystallized from an ethyl alcohol-ethyl ether mixture to give 1.65 g of white, crystalline 1-adamantanecarboxamidoxime hydrochloride, mp 242°–244°; $\lambda_{max}^{KBR}$ 2.98, 3.19, 3.25, 3.30 (free and hydrogen bonded NH), 3.42 (CH), 3.49 (CH), 6.04 (C=N) and 6.28 μ (—NH₂).

EXAMPLE 3

1-Adamantanecarboxamidoxime-O-acetate

R=adamantyl;

$$R^1 = -\overset{O}{\underset{\|}{C}} - CH_3$$

To a dry round bottom flask equipped with a magnetic stirrer, nitrogen inlet, and drying tube was added 30 ml anhydrous dimethylformamide and 5.82 g (0.03 moles) of 1-adamantanecarboxamidoxime. After dissolution, 3.06 g (0.03 moles) of acetic anhydride was added and the resulting mixture stirred 2 hours at 25° and subsequently hydrolyzed in 175 ml of water with stirring. The resulting white precipitate was filtered, washed well with water and dried in vacuo. The product was crystallized from benzene giving 6.05 g (86 percent yield) of 1-adamantanecarboxamidoxime-O-acetate as white crystals, mp 149°–150°. $\lambda_{max}^{KBr}$ 2.84 (NH), 2.99 (NH), 3.46 (CH), 5.76 (—OCOCH₃) and 8.10 μ (—OCOCH₃).

$\delta_{max}^{CDCl_3}$ 5.17–4.29 (NH₂, broad multiplet), 2.15 (OCOCH₃, singlet), and 2.10–1.63 Hz (adamantane CH's multiplet).

Anal. Calcd. for $C_{13}H_{20}N_2O_2$: C, 66.07; H, 8.53; N, 11.86
Found: C, 65.98; H, 8.84; N, 11.91

EXAMPLES 4–7

Using the general procedure described in Example 1 but employing other nitriles the amidoximes were prepared from the corresponding nitriles as shown in Example 4. The hydrochlorides were prepared as shown in Examples 5–7.

| Ex. No. | Name | Structural formula of R | Yield percent | M.P. | Calcd C | Calcd H | Calcd N | Found C | Found H | Found N |
|---|---|---|---|---|---|---|---|---|---|---|
| 4 | 2-adamantylcarboxamidoxime | 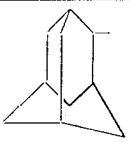 | 79 | 193–95 | 68.00 | 9.34 | 14.42 | 67.99 | 9.83 | 14.39 |
| 5 | Δ⁴-tricyclo[4.3.1.1³,⁸]-4-undecenylcarboxamidoxime hydrochloride. | 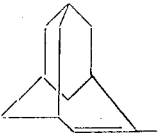 | 43 | 199–200 | 59.4 | 7.9 | 11.5 | 58.73 | 7.61 | 11.37 |
| 6 | Tricyclo[4.3.1.1³,⁸]undecanyl-4-carboxamidoxime hydrochloride. | 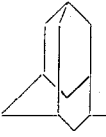 | 68 | ª210–11 | 59.0 | 8.7 | 12.2 | 58.40 | 8.65 | 11.48 |
| 7 | 4-methylbicyclo[2.2.2]octyl-1-carboxamidoxime hydrochloride. | 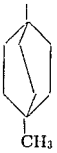 | 75 | 218–19 | 54.9 | 8.7 | 12.8 | 55.09 | 8.79 | 12.66 |

ª Decomposition.

The amidoximes form internal metal complexes in which the metal atom is linked to the oxime and amino group, i.e., by chelation where, e.g., the metal is nickel, copper, or cobalt. These products are generally colored and useful as coloring agents.

The amidoximes also form pharmaceutically acceptable acid addition salts such as hydrochloride, hydrobromide, dihydrogen phosphate, hydrogen tartrate, hydrogen maleate, acetate, dihydrogen citrate, succinate, mandelate, lactate, etc. They are prepared by treatment of the amidoxime with equivalent amounts of the acid. These salts are particularly useful for the preparation of aqueous solutions of the amidoxime for formulation and administration as antiviral agents.

One aspect of this invention relates to methods of preventing, curing, and/or mitigating influenza virus infections in warm-blooded animals comprising administering to said animals an effective amount of the compounds of the invention. The compounds of the invention are particularly useful in controlling influenza virus infections of warmblooded animals. It will be understood that the term "warm-blooded animals" includes members of the animal kingdom possessed of a homeostatic mechanism and includes birds as well as mammals.

The compounds can be administered by any means that effects contact of the active ingredient compound with the site of influenza virus infection in the body of a warm-blooded animal. It will be understood that this includes the site prior to infection as well as after. For example, administration can be made parenterally, that is, subcutaneously intravenously, or intramuscularly.

The preferred route of administration is the oral route.

The dosage administered will be dependent upon the influenza virus being treated, the age, health and weight of the recipient, the extent of infection, kind of concurrent treatment if any, frequency of treatment, and the nature of the effect desired. Generally, a daily dosage of active ingredient compound will be from about 1 to 50 milligrams per kilogram of body weight, although lower, such as 0.5 milligrams, per kilogram or higher amounts can be used. Ordinarily, from 1 to 20 and preferably 1 to 10 milligrams per kilogram per day, in one or more applications per day is effective to obtain the desired result.

These compounds are effective against all upper respiratory influenza viruses because experiments show effectiveness against two types, B/AA, and A2/Bethesda that are representative of, and show correlation to, all upper respiratory influenza viruses. Effectiveness in mice such as shown below indicates effectiveness of such compounds for all warm-blooded animals.

Swiss Webster mice (male or female, 25 to 32 days of age) were selected within a 3-day range and a 10 percent weight range. They were infected intranasally under light ether anesthesia with 5 to 10 $LD_{50}$'s of the proper virus strain contained in 0.05 ml inoculum. The test compound was dosed (1) orally at 40 mg/kg as a suspension in water 10 to 30 minutes before infection time and in the drinking water from infection time until test termination, or, (2) in the drinking water only, beginning 24 hours before infection time through 72 hours after infection time. Daily mortality was recorded through the test period. At the end of the test period, the daily mortality data was converted to % survival and mean survival days (MSD). when 1-adamantanecarboxamidoxime was dosed at 40 mg/kg of body weight, in drinking water (at a concentration of 0.2 mg/ml) 30 minutes before infection with Influenza B/AA; the infectivity was reduced in accordance with the data in Table 1.

TABLE 1

| $Log_{10}$ Virus Dilution | Treatment | Number of Mice | Mean % Survivors | Mean Survival Day |
|---|---|---|---|---|
| 2.3 | Compound | 37 | 69.5 | 7.86 |
|  | Control | 40 | 56.1 | 6.92 |
| 2.8 | Compound | 39 | 72.5 | 8.08 |
|  | Control | 40 | 62.5 | 7.38 |
| 3.3 | Compound | 40 | 87.1 | 9.1 |
|  | Control | 40 | 75.7 | 8.3 |

The same compound was dosed at varying concentrations based on body weight, in drinking water (at concentrations of 0.5, 0.2, 0.08 and 0.032 mg/ml, respectively) from 24 hours before through 72 hours after infection with Influenza A2/Bethesda; the infectivity was reduced in accordance with the data in Table 2.

TABLE 2

| Mg/Kg (Av./24 hrs.) | Survivors % Day 10 | Survivors Mean % Days 5–10 | Disease Severity Mean/ Day 8 | Disease Severity % Reduction Day 8 | MSD |
|---|---|---|---|---|---|
| 63.1 | 86.2 | 90 | 0.828 | 66.6 | 9.4 |
| 27.8 | 55.6 | 76.7 | 1.741 | 29.9 | 8.6 |
| 11.3 | 48.3 | 69.4 | 2.103 | 15.3 | 8.2 |
| 4.5 | 28.6 | 60.3 | 2.464 | 0.7 | 7.6 |
| 0 | 20.7 | 54.1 | 2.483 | — | 7.3 |

Additional mice were treated with other compounds of this invention at a dosage of 40 mg/kg of body weight of the compound (at a concentration of 5 mg/kg in water) 30 minutes prior to infection with Influenza A2/-Bethesda and in drinking water for 72 hours. Table 3 shows the compounds used, the number of mice used, and number and percentage of survival after 7 days.

TABLE 3

| Compound or Control | No. Tested | Mice No. Survived | % Survived |
|---|---|---|---|
| 2-Adamantylcarboxamidoxime hydrochloride | 18 | 12 | 66.7 |
| Control | 96 | 13 | 13.5 |
| $\Delta^4$-Tricyclo[4.3.1.1$^{3,8}$]-4-undecenylcarboxamidoxime hydrochloride | 18 | 14 | 77.8 |
| Control | 108 | 18 | 16.7 |
| Tricyclo[4.3.1.1$^{3,8}$]undecanyl-4-carboxamidoxime hydrochloride | 18 | 13 | 72.2 |
| Control | 108 | 16 | 14.8 |
| 4-Methylbicyclo[2.2.2]octyl-1-carboxamidoxime hydrochloride | 18 | 14 | 77.8 |
| Control | 108 | 16 | 14.8 |

The active ingredient of this invention can be employed in useful compositions according to the present invention in such dosage forms as tablets, capsules, powder packets, or liquid solutions, suspensions, or elixirs, for oral administration or liquid for parenteral use, and in certain cases, suspensions for parenteral use (except intravenous). In such compositions, the active ingredient will ordinarily always be present in an amount of at least 0.5% by weight based on the total weight of the composition and not more than 90% by weight.

Besides the active ingredient of this invention, the influenza antiviral composition will contain a solid or liquid nontoxic pharmaceutical carrier for the active ingredient.

In one embodiment of a pharmaceutical composition of this invention, the solid carrier is a capsule which can be of the ordinary gelatin type. In the capsule will be from about 20–60 percent by weight of a compound of formula (I) and (II) and 80–40 percent of a carrier. In another embodiment, the active ingredient is tableted with or without adjuvants. In yet another embodiment, the active ingredient is put into powder packets and employed. These capsules, tablets and powders will generally constitute from about 5 percent to about 95 percent and preferably from 25 to 90 percent by weight. These dosage forms preferably contain from about 5 to about 500 milligrams of active ingredient, with from about 25 to about 250 most preferred.

The pharmaceutical carrier can be a sterile liquid such as water and oils, including those of petroleum, animal, vegetable or synthetic origin, for example peanut oil, soybean oil, mineral oil, sesame oil, and the like. In general, water, saline, aqueous dextrose (glucose) and related sugar solutions and glycols such as propylene glycol or polyethylene glycols are preferred liquid carriers, particularly for injectible solutions. Sterile injectible solutions such as saline will ordinarily contain from about 0.5 to 25 percent and preferably about 1 to 10 percent by weight of the active ingredient.

As mentioned above, oral administration can be in a suitable suspension or syrup, in which the active ingredient ordinarily will constitute from about 0.5 to 10 percent and preferably about 2 to 5 percent, by weight. The pharmaceutical carrier in such composition can be a watery vehicle such as an aromatic water, a syrup or a pharmaceutical mucilage.

Suitable pharmaceutical carriers are described in "Remington's Pharmaceutical Sciences" by E. W. Martin, a well-known reference text in this field.

The following are exemplary of pharmaceutical compositions suitable for adminstration.

EXAMPLE A

Tablets are prepared using conventional procedures and equipment. Each tablet contains 100 mg. of 1-adamantanecarboxamidoxime hydrochloride, 0.2 mg. of pyrogenic silica, 6 mg. of magnesium stearate, 6 mg. of talc, 6 mg. of ethylcellulose, 10 mg. of microcrystalline cellulose, 6 mg. of corn starch and 65.8 mg. of lactose.

EXAMPLE B

Hard gelatin capsules can be filled so that each capsule contains 50 mg. of 2-adamantylcarboxamidoxime, 5 mg. of magnesium stearate, 20 mg. of talc and 175 mg. of anhydrous lactose. Standard capsule filling equipment is used to prepare the capsules.

EXAMPLE C

A flavored suspension can be prepared so that each 5 ml. contains 25 mg. of 1-admantanecarboxamidoxime-O-acetate, 50 mg. of tragacanth, 125 mg. of sodium citrate, 4.5 mg. of methyl paraben, 0.5 mg. of propyl paraben, 5 mg. of polysorbate 80, 2500 mg. of sorbitol solution, U.S.P. flavor q.s. and water q.s.

I claim:
1. An antiinfluenza pharmaceutical composition comprising at least 0.5 percent and not more than 90 percent by weight based on the total weight of the composition of
(a) a compound of the formula

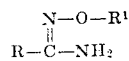

wherein
R = adamantyl, 4-methylbicyclo[2.2.2]octyl, tricyclo[4.3.1.1$^{3,8}$]undecanyl or tricyclo[4.3.1.1$^{3,8}$]undecenyl, and
R$^1$ = hydrogen or alkanoyl of 2–6 carbon atoms, or b pharmaceutically acceptable acid addition salt of (a) and a pharmaceutically acceptable carrier.

2. A composition of claim 1 wherein the compound is 1-adamantanecarboxamidoxime.
3. A composition of claim 1 wherein the compound is 1-adamantanecarboxamidoxime hydrochloride.
4. A composition of claim 1 wherein the compound is 1adamantanecarboxamidoxime-O-acetate.
5. A method of controlling influenza virus infection in a warm-blooded animal comprising administering to said animal anti-influenza effective amount of a composition of claim 1.
6. A method of controlling influenza virus infection in a warm-blooded animal comprising administering to said animal an anti-influenza effective amount of a composition of claim 2.
7. A method of controlling influenza virus infection in a warm-blooded animal comprising administering to said animal an anti-influenza effective amount of a composition of claim 3.
8. A method of controlling influenza virus infection in a warm-blooded animal comprising administering to said animal an anti-influenza effective amount of a composition of claim 4.

* * * * *